(No Model.)
B. P. WHITE.
CHURN.
No. 349,376. Patented Sept. 21, 1886.
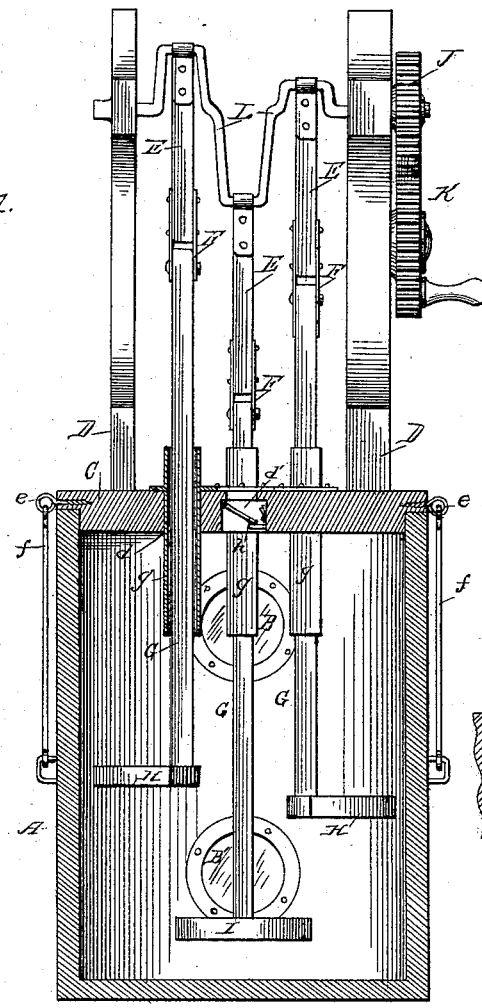
Fig. 1.
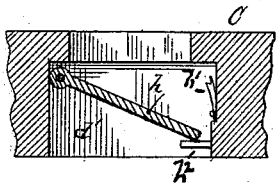
Fig. 3.
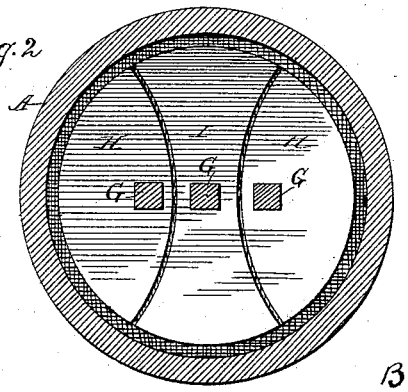
Fig. 4.
Fig. 2.
Witnesses
W. R. David.
Wm. H. Bates.
Inventor
Benjamin P. White
By his Attorney
Edw. J. Underwood

UNITED STATES PATENT OFFICE.

BENJAMIN P. WHITE, OF EAST LYNNE, MISSOURI.

CHURN.

SPECIFICATION forming part of Letters Patent No. 349,376, dated September 21, 1886.

Application filed June 8, 1886. Serial No. 204,512. (No model.)

*To all whom it may concern:*

Be it known that I, BENJAMIN P. WHITE, a natural-born citizen of the United States, residing at East Lynne, in the county of Cass and State of Missouri, have invented certain new and useful Improvements in Churns; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in churns; and it consists in certain details of construction, to be hereinafter more fully described in the specification, and pointed out in the claims.

In the accompanying drawings, Figure 1 is a vertical sectional view. Fig. 2 is a horizontal section; Fig. 3, a detail view of one of the valves, and Fig. 4 is a view of the triple crank.

The objects of my said invention are to provide a triple eccentric crank and triple dashers, whereby the butter-making process will be accelerated, and as the dashers are attached to the crank at three points of its eccentricity equidistant from each other in its plane of rotation, it will be impossible to have it stop on a "dead-center," and as the several dashers have an equal amount of surface the strokes will be made with equal force and without jar, and as the edges of the dashers fit into each other, and each rises and falls independently of the others, a greater agitation of the cream is effected; and, further, I provide on opposite sides of the churn glass windows at or near the top and bottom, so that the contents can be inspected, and I place in openings in the top of the churn (one or more) valves opening inwardly, which will prevent the escape of the contents, even should the churn be full, but yet admit the air. I construct a metallic or wooden churn, A, of cylindrical shape, having the sides and bottom integral, and provided with windows B B' near the top and bottom. On this is fitted the top or cover C, provided with standards D, to support and carry the crank, and having openings $d$ for the passage of the dasher-staffs, and other openings, $d'$, with valves $h$, opening inwardly to prevent the escape of the contents.

I construct my valves as follows: Within the valve-opening $d'$ is pivoted or hinged the valve-gate $h$, which, when the churn is in its natural position, rests upon a stop, $h^2$, leaving an opening for the passage of the air and escape of odors from the contents of the churn; but if the churn is overturned the valve-gate $h$ will be lifted by the volume of cream and caught by the spring-catch $h'$, thus closing and securing the opening $d'$. The cover is flanged to fit the top of the churn, and has on each side eyebolts $e$, in which hooks $f$, attached about midway to the sides of the cylinder, enter, and thus secure the top when closed. The standards D carry the crank L, which is made triply eccentric, and has attached three dasher-rods, E, which are secured by knuckle-joints F to the dasher-staffs G, which pass by openings in the cover into and through guards or thimbles $g$, the latter extending some distance above and below the cover, to prevent the escape of the contents through the openings $d$; and at the lower ends of the dasher-staffs are secured the dashers, which are shaped as follows: The outer dashers, H, are elliptical, and the inner one, I, nearly in the shape of an hour-glass, and arranged so that the concavities of the inner one will accord with the convexities of the other two, and together they will occupy nearly the entire periphery of the churn-cylinder, leaving, however, a slight clear space around their combined outside, so that when forced down the cream will rise vertically above them, and, having each a stroke independently of the others, will cause lateral as well as vertical currents in the contents of the churn and facilitate and hasten the process of butter-making. The crank ends are journaled in the tops of the standards D, and at one end is a gear-wheel, J, meshing with another and larger wheel, K, mounted on a stud or projection in the standard, and provided with a handle by which the mechanism is operated. The crank is triply eccentric, each bend or arm being at a different angle or inclination from the others. As the top is secured to the body of the churn by the hooks and eyebolts, it follows that should the churn be accidentally overturned no loss of the contents would ensue.

Operation: Detach the hooks from the eyebolts, when the top with all the mechanism can be lifted from the churn, the latter filled with cream, the top replaced and secured by the hooks, when it is ready for use.

I am aware that it is not new to provide a churn with an eccentric crank and several dashers, nor jointed dasher-staffs; therefore I claim none of these, broadly; neither do I claim a winch nor gear-wheels alone; but What I do claim, and desire to secure by Letters Patent, is—

1. In a reciprocating-dasher churn whose central dasher is constructed with concave sides, within which fit one side each of two convex adjacent dashers, whereby in the revolution of the triple-crank shaft three independent alternating strokes of the dashers are made in such manner as to form lateral and vertical currents in the cream, the combination of the said dashers, the triple-crank shaft, and the dasher rods and staffs, constructed, arranged, and operating substantially as described.

2. In a reciprocating-dasher churn, the combination of the churn body or cylinder A, provided with glass windows at top and bottom, with the jointed dasher staffs and rods E G and segmental dashers H I, each moving independently of the others, whereby lateral currents are formed in the churn, the triple eccentric shaft L, the removable head C, having air-openings with valves therein so constructed as to automatically close when the churn is accidentally overturned, as herein described, the eyebolts $e$, the hooks $f$, and the operating mechanism, all constructed, arranged, and operating substantially as described.

In testimony whereof I affix my signature in presence of two witnesses.

BENJAMIN P. WHITE.

Witnesses:
D. P. KENAGY,
A. S. BEERS.